(12) United States Patent
Asterjadhi et al.

(10) Patent No.: US 9,998,370 B2
(45) Date of Patent: Jun. 12, 2018

(54) SECURITY FOR PACKETS USING A SHORT MAC HEADER

(71) Applicant: QUALCOMM Incorporated, San Diego, CA (US)

(72) Inventors: Alfred Asterjadhi, San Diego, CA (US); Maarten Menzo Wentink, Naarden (NL); Simone Merlin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 14/703,063

(22) Filed: May 4, 2015

(65) Prior Publication Data

US 2015/0304217 A1    Oct. 22, 2015

Related U.S. Application Data

(62) Division of application No. 13/840,166, filed on Mar. 15, 2013, now Pat. No. 9,906,444.

(60) Provisional application No. 61/736,513, filed on Dec. 12, 2012.

(51) Int. Cl.
| | |
|---|---|
| *H04L 12/741* | (2013.01) |
| *H04W 12/02* | (2009.01) |
| *H04W 12/10* | (2009.01) |
| *H04W 28/06* | (2009.01) |

(52) U.S. Cl.
CPC ............ *H04L 45/74* (2013.01); *H04W 12/02* (2013.01); *H04W 12/10* (2013.01); *H04W 28/06* (2013.01)

(58) Field of Classification Search
None
See application file for complete search history.

(56) References Cited

U.S. PATENT DOCUMENTS

| 6,032,197 | A  | * | 2/2000  | Birdwell | H04L 12/18 709/216 |
|---|---|---|---|---|---|
| 8,054,836 | B2 | * | 11/2011 | Fischer | H04L 47/10 370/394 |
| 8,243,931 | B2 | * | 8/2012  | Yi | H04L 1/0061 380/270 |
| 8,737,421 | B2 | * | 5/2014  | Zhang | H04W 12/02 370/242 |
| 2003/0191955 | A1 | | 10/2003 | Wagner et al. | |
| 2003/0198250 | A1 | * | 10/2003 | Hakenberg | H04L 29/06 370/457 |

(Continued)

FOREIGN PATENT DOCUMENTS

| JP | 2008259094 A  | 10/2008 |
|---|---|---|
| WO | 2009098572 A1 | 8/2009 |

(Continued)

OTHER PUBLICATIONS

International Preliminary Report on Patentability—PCT/US2013/074614, The International Bureau of WIPO—Geneva, Switzerland, dated Mar. 10, 2015.

(Continued)

*Primary Examiner* — Kibrom T Hailu
(74) *Attorney, Agent, or Firm* — Patterson & Sheridan, LLP

(57) ABSTRACT

Certain aspects of the present disclosure provide methods and apparatus for applying security to packets, for example, packets utilizing short MAC headers.

20 Claims, 9 Drawing Sheets

(56) References Cited

U.S. PATENT DOCUMENTS

| | | |
|---|---|---|
| 2005/0169480 A1 | 8/2005 | Kuehn et al. |
| 2006/0153375 A1 | 7/2006 | Yi |
| 2007/0081673 A1 | 4/2007 | Ren |
| 2008/0013729 A1* | 1/2008 | Vialen .................. H04W 12/06 380/270 |
| 2008/0059860 A1* | 3/2008 | Kano .................... H04L 1/1642 714/748 |
| 2008/0098218 A1 | 4/2008 | Sibigtroth et al. |
| 2008/0247413 A1 | 10/2008 | Ono |
| 2009/0052388 A1 | 2/2009 | Kim et al. |
| 2011/0026505 A1 | 2/2011 | Trainin |
| 2011/0055558 A1* | 3/2011 | Liu ....................... H04L 9/0637 713/160 |
| 2012/0026924 A1 | 2/2012 | Zhang et al. |
| 2012/0284517 A1 | 11/2012 | Lambert |
| 2014/0161126 A1 | 6/2014 | Asterjadhi et al. |

FOREIGN PATENT DOCUMENTS

| | | |
|---|---|---|
| WO | WO-2011028565 A1 | 3/2011 |
| WO | 2012159082 A2 | 11/2012 |
| WO | WO-2013116132 A1 | 8/2013 |

OTHER PUBLICATIONS

International Search Report and Written Opinion—PCT/US2013/074614—ISA/EPO—Mar. 17, 2014.

* cited by examiner

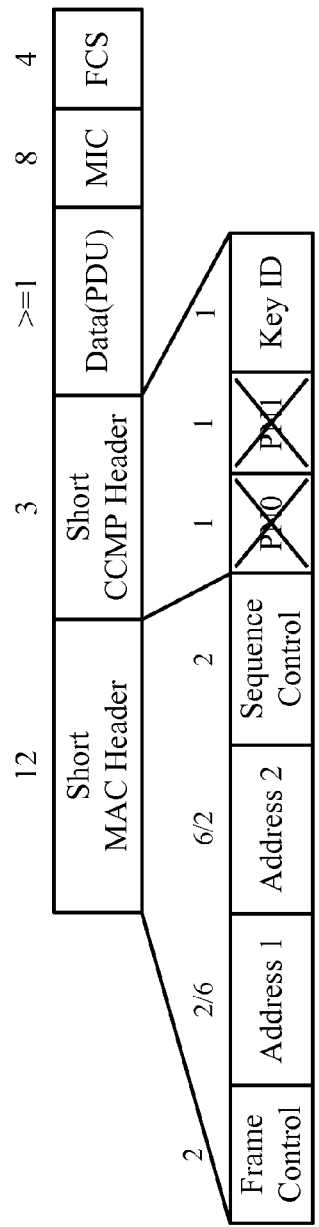
FIG. 8
FIG. 8A

SECURITY FOR PACKETS USING A SHORT MAC HEADER

CLAIM OF PRIORITY UNDER 35 U.S.C. § 119

The present application for patent is a divisional of U.S. patent application Ser. No. 13/840,166, filed Mar. 15, 2013, pending, which claims priority to U.S. Provisional Patent Application Ser. No. 61/736,513, filed Dec. 12, 2012, which are assigned to the assignee hereof and hereby expressly incorporated herein by reference in its entirety.

FIELD OF THE INVENTION

Certain aspects of the present disclosure generally relate to wireless communications and, more particularly, to techniques for enabling overhead for packets using a short MAC header.

RELEVANT BACKGROUND

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the desire for greater coverage and increased communication range, various schemes are being developed. One such scheme is the sub-1-GHz frequency range (e.g., operating in the 902-928 MHz range in the United States) being developed by the Institute of Electrical and Electronics Engineers (IEEE) 802.11ah task force. This development is driven by the desire to utilize a frequency range that has greater wireless range than other IEEE 802.11 groups and has lower obstruction losses.

SUMMARY

Certain aspects of the present disclosure provide an apparatus for wireless communications. The apparatus typically includes a processing system generally configured to store a portion of a set of information locally, at the apparatus, receive a packet, said packet comprising a data field encoded using the set of information, and decode the data field using the stored portion of the set of information and additional information contained in the packet.

Certain aspects of the present disclosure provide an apparatus for wireless communications. The apparatus typically includes a processing system configured to signal, to a receiving entity, a portion of a set of information used to encode a data portion of a packet and transmit, to the receiving entity, a packet with the data field encoded using the set of information, wherein the packet lacks some of the set of information used to encode the data field.

Certain aspects of the present disclosure provide an apparatus for wireless communications. The apparatus typically includes means for storing a portion of a set of information locally, at the apparatus, means for receiving a packet, said packet comprising a data field encoded using the set of information, and means for decoding the data field using the stored portion of the set of information and additional information contained in the packet.

Certain aspects of the present disclosure provide an apparatus for wireless communications. The apparatus typically includes means for signaling, to a receiving entity, a portion of a set of information used to encode a data portion of a packet and means for transmitting, to the receiving entity, a packet with the data field encoded using the set of information, wherein the packet lacks some of the set of information used to encode the data field.

Certain aspects of the present disclosure provide a method for wireless communications by an apparatus. The method typically includes storing a portion of a set of information locally, at the apparatus, receiving a packet, said packet comprising a data field encoded using the set of information, and decoding the data field using the stored portion of the set of information and additional information contained in the packet.

Certain aspects of the present disclosure provide a method for wireless communications by an apparatus. The method typically includes signaling, to a receiving entity, a portion of a set of information used to encode a data portion of a packet and transmitting, to the receiving entity, a packet with the data field encoded using the set of information, wherein the packet lacks some of the set of information used to encode the data field.

Certain aspects of the present disclosure provide a computer program product for wireless communications by an apparatus comprising a computer-readable medium having instructions stored thereon. The instructions are generally executable for storing a portion of a set of information locally, at the apparatus, receiving a packet, said packet comprising a data field encoded using the set of information, and decoding the data field using the stored portion of the set of information and additional information contained in the packet.

Certain aspects of the present disclosure provide a computer program product for wireless communications by an apparatus comprising a computer-readable medium having instructions stored thereon. The instructions are generally executable for signaling, to a receiving entity, a portion of a set of information used to encode a data portion of a packet and transmitting, to the receiving entity, a packet with the data field encoded using the set of information, wherein the packet lacks some of the set of information used to encode the data field.

Certain aspects of the present disclosure provide a station for wireless communications. The station typically includes a processing system generally configured to store a portion of a set of information locally, at the station, receive a packet, said packet comprising a data field encoded using the set of information, and decode the data field using the stored portion of the set of information and additional information contained in the packet.

Certain aspects of the present disclosure provide an access point for wireless communications. The access point typically includes a processing system configured to signal, to a station, a portion of a set of information used to encode a data portion of a packet and transmit, to the station, a packet with the data field encoded using the set of information, wherein the packet lacks some of the set of information used to encode the data field.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 8 illustrates another example packet structure with a compressed CCMP header, in accordance with aspects of the present disclosure.

FIG. 8A illustrates an example compressed CCMP header, in accordance with aspects of the present disclosure.

DETAILED DESCRIPTION

Figure 1:
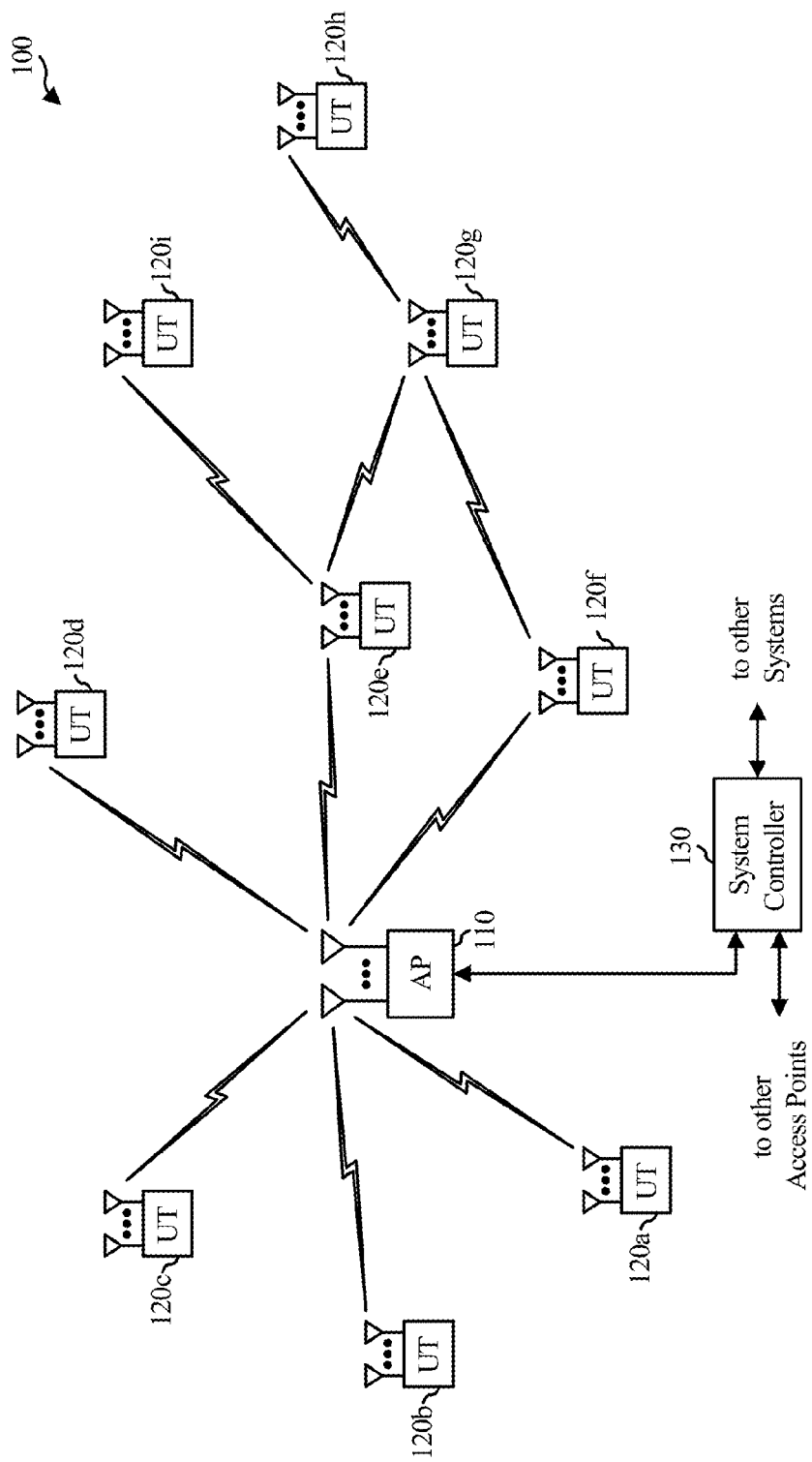
FIG. 1 illustrates a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device, or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
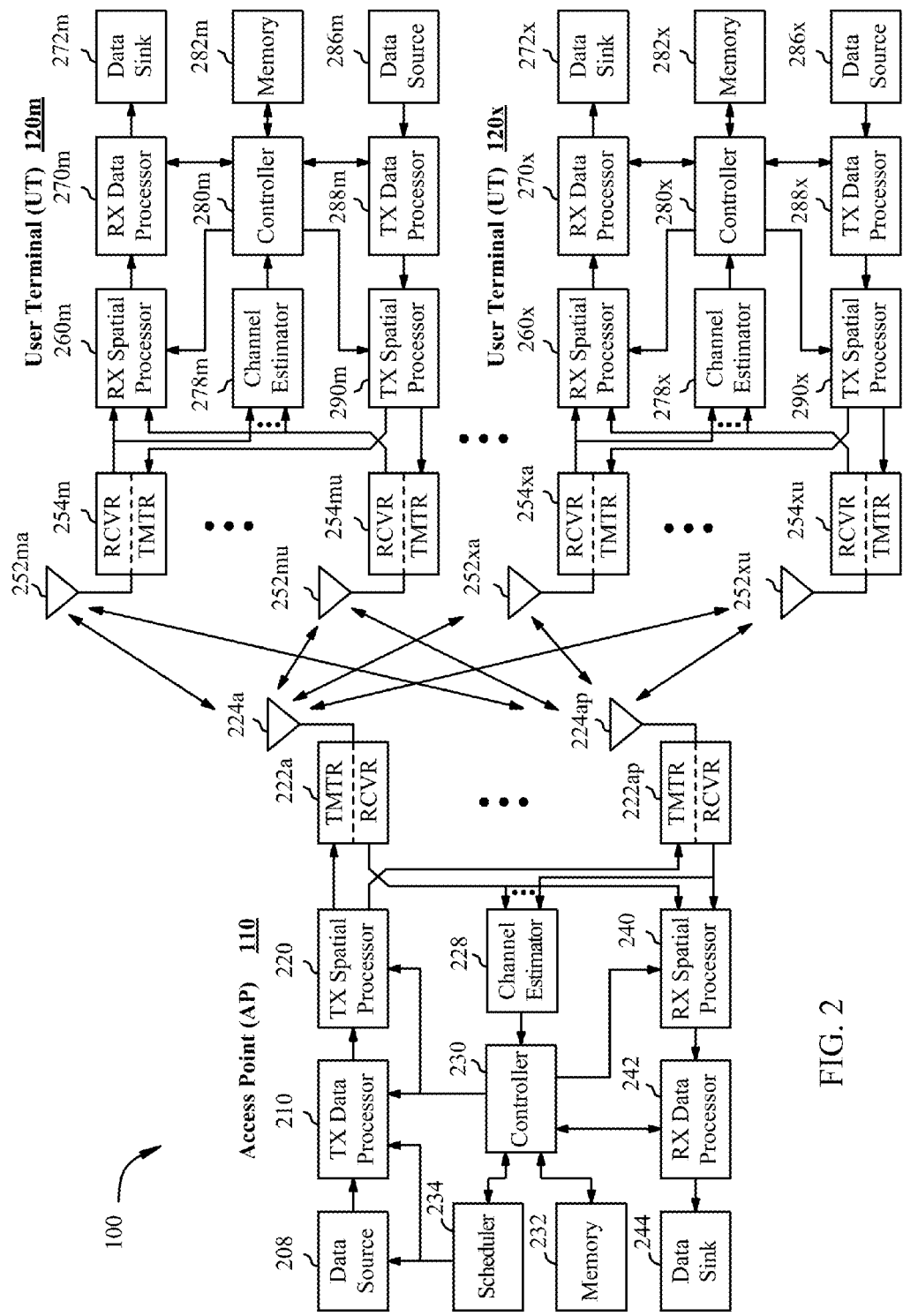
FIG. 2 illustrates a block diagram of an example access point and user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal On the uplink, at each user terminal 120 selected for uplink transmission, a transmit (TX) data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

$N_{up}$ user terminals may be scheduled for simultaneous transmission on the uplink. Each of these user terminals performs spatial processing on its data symbol stream and transmits its set of transmit symbol streams on the uplink to the access point.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with the CCMI, MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

Figure 3:
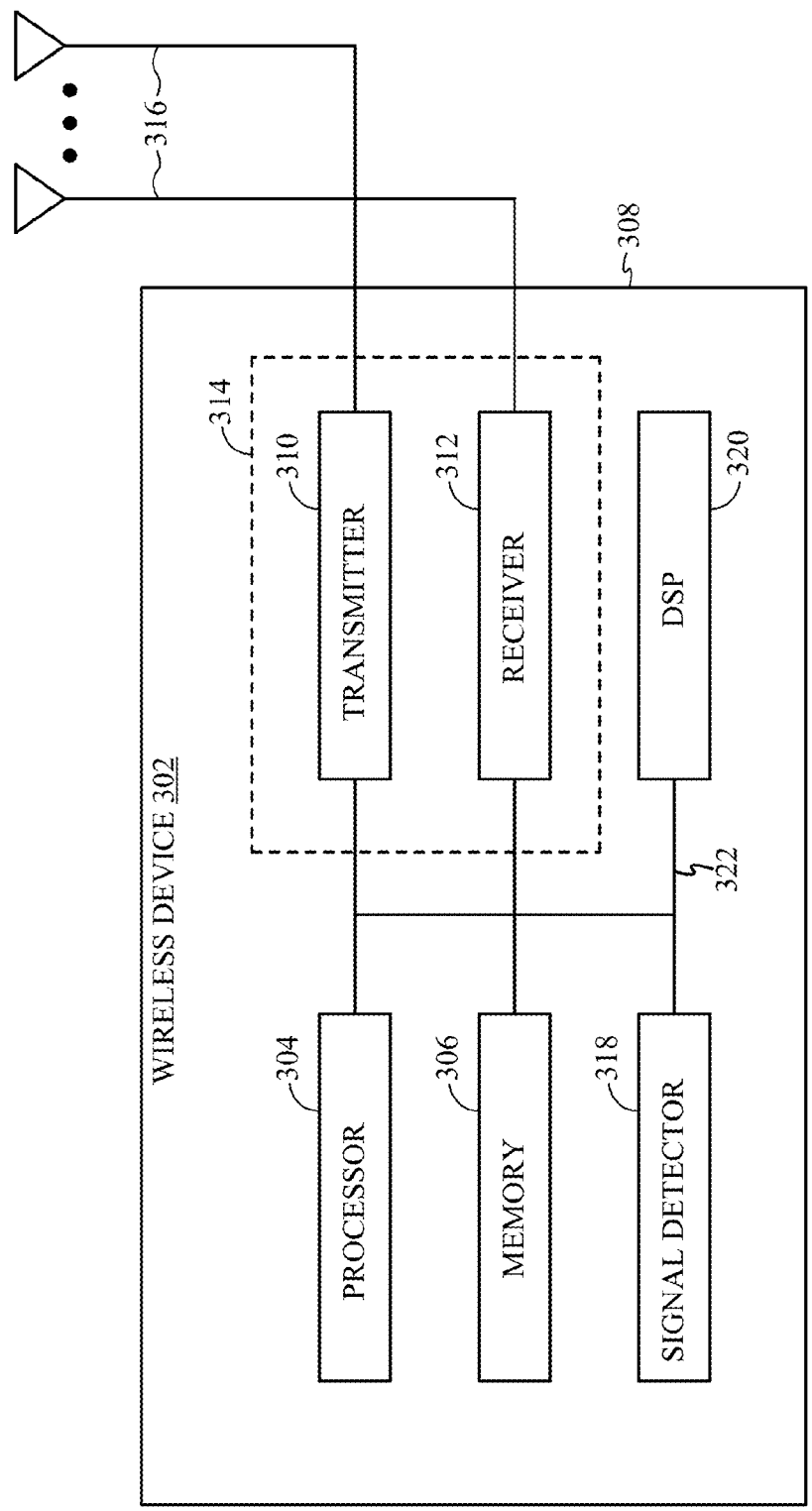
FIG. 3 illustrates a block diagram of an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Security for Packets with Short MAC Headers

The use of packet structures with Short MAC headers (compressed relative to full MAC headers) has been accepted in certain standards, such as IEEE 802.11ah. The short MAC Header defined in 802.11ah is reduced to 12 Bytes from the 34 Bytes of a normal MAC Header. A reduced number of bits in short MAC headers allows reduction of overhead and is especially beneficial for short data packets where overhead accounts for a larger percentage of overall packet size.

Techniques presented herein provide techniques for reducing overhead for encrypted packets, such as those using short MAC Headers. The techniques presented herein provide various options to reduce overhead associated with per-packet encryption. These techniques may be used separately or, in some cases, combined to achieve greater reductions in overhead.

Figure 4:
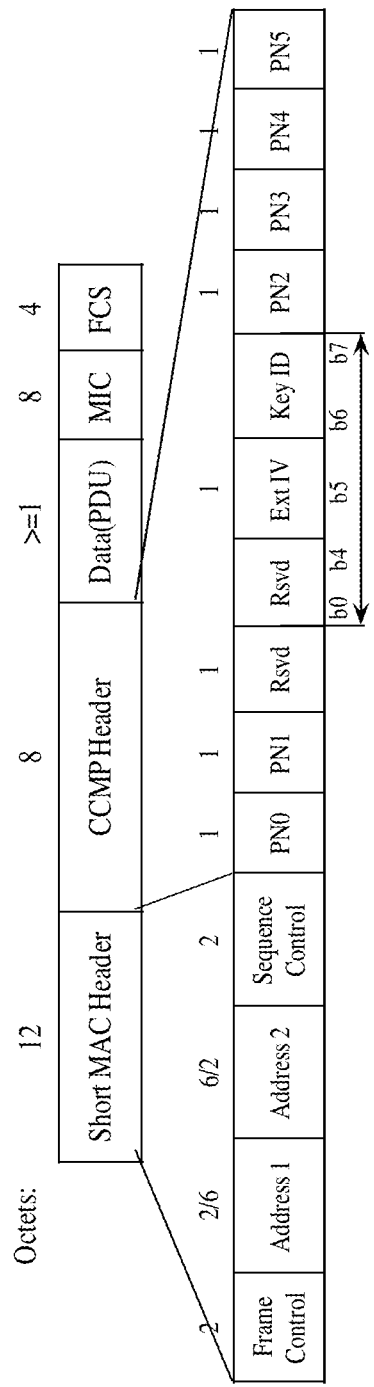
FIG. 4 illustrates an example packet structure utilizing a short MAC header.

FIG. 4 illustrates an example of a packet 400 (in the illustrated example, an MPDU) with a short MAC header 410, but a full CCMP header 420. As illustrated, the MAC header 420 which contains the destination and source address of the data packet and a CCMP header with a packet number (PN), an Ext IV, and a key ID. As illustrated, the packet number is a 48-bit number stored across 6 octets (as illustrated, the PN codes are the first two and last four octets of the CCMP header) and are incremented for each subsequent packet. The Key ID octet contains the Ext IV (bit 5), Key ID (bits 6-7), and a reserved subfield (bits 0-4).

This information in the CCMP header is used to encrypt the data unit and the Message Integrity Code (MIC) which protects the integrity and authenticity of the packet. The frame check sequence (FCS) which is used for error detection and correction is not encrypted.

Techniques presented herein may help reduce the overhead associated with transmitting a CCMP Header. According to certain aspects, part of the CCMP information (conventionally carried in a full CCMP header) may be stored at the receiver. For example, if the upper 4 bytes of the PN are stored, the CCMP header may be reduced by 4 bytes. In addition, or as an alternative, unnecessary (reserved) fields may be removed (1 Byte). Other techniques discussed below may result in further reductions.

Figure 5:
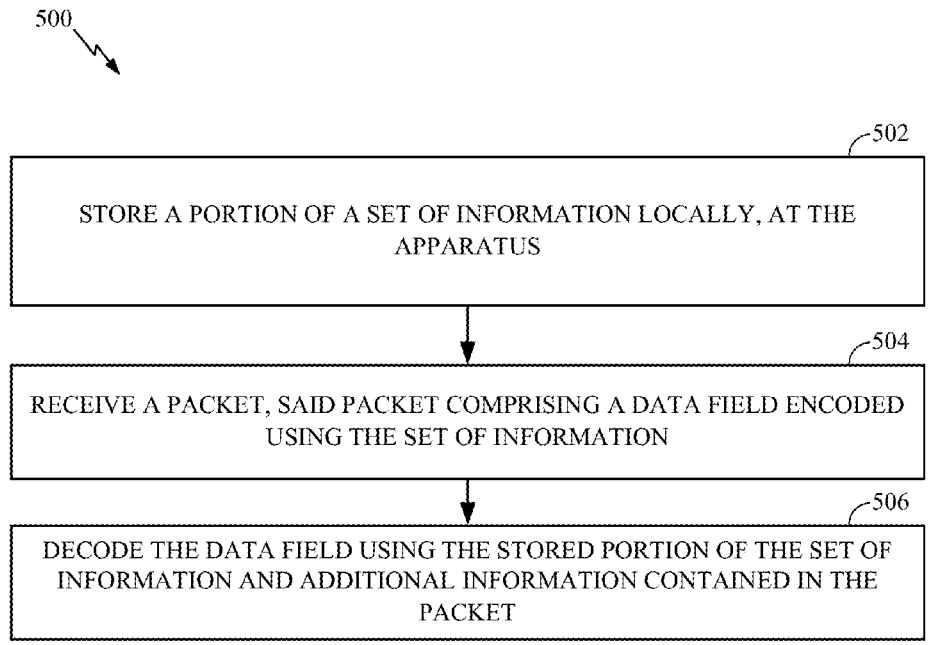
FIG. 5 illustrates a block diagram of example operations for wireless communications by a receiver, in accordance with certain aspects of the present disclosure.

FIG. 5 is a block diagram of example operations 500 for wireless communications by a receiving entity, in accordance with aspects of the present disclosure. The operations 500 may be performed by an apparatus, such as a station or access point.

At 502, the apparatus store a portion of a Counter Cipher Mode Protocol (CCMP) information locally, at the apparatus. At 504, the apparatus receives a packet with a MAC header, an indication of a type of the MAC header, and a data field encrypted using the CCMP information. At 506, the apparatus decrypts the data field using the stored portion of the CCMP information and additional information contained in the packet.

Figure 6:
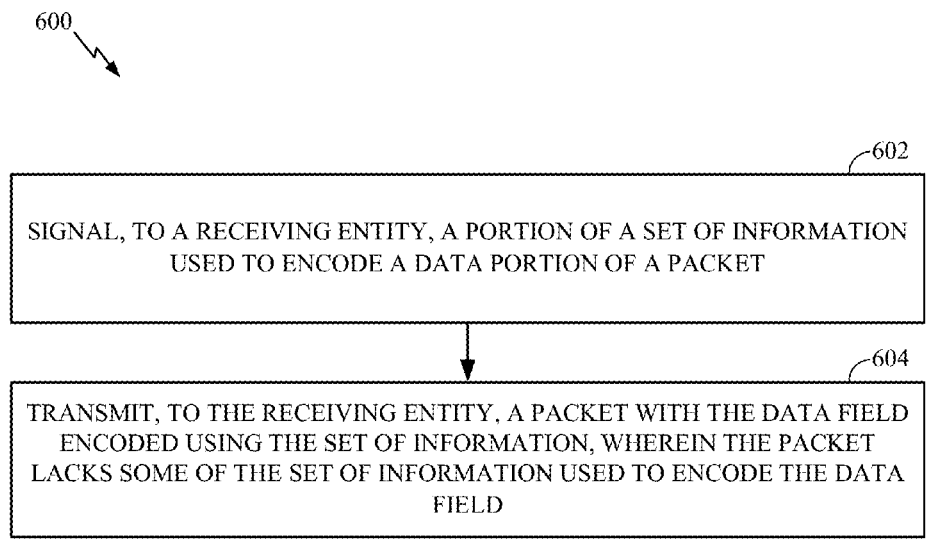
FIG. 6 illustrates a block diagram of example operations for wireless communications by a transmitter, in accordance with certain aspects of the present disclosure.

FIG. 6 is a block diagram of example operations 600 for wireless communications by a transmitting entity, in accordance with aspects of the present disclosure. The operations 600 may be performed by an apparatus, such as a station, or access point.

At 602, the apparatus signals a portion of a Counter Cipher Mode Protocol (CCMP) information to a receiving entity, to be stored at the receiving entity. At 604, the apparatus transmits a packet with a MAC header, an indication of a type of the MAC header, and a data field encrypted using the CCMP information, wherein the packet lacks some of the CCMP information used to encrypt the data field.

Figures 7, 7A:
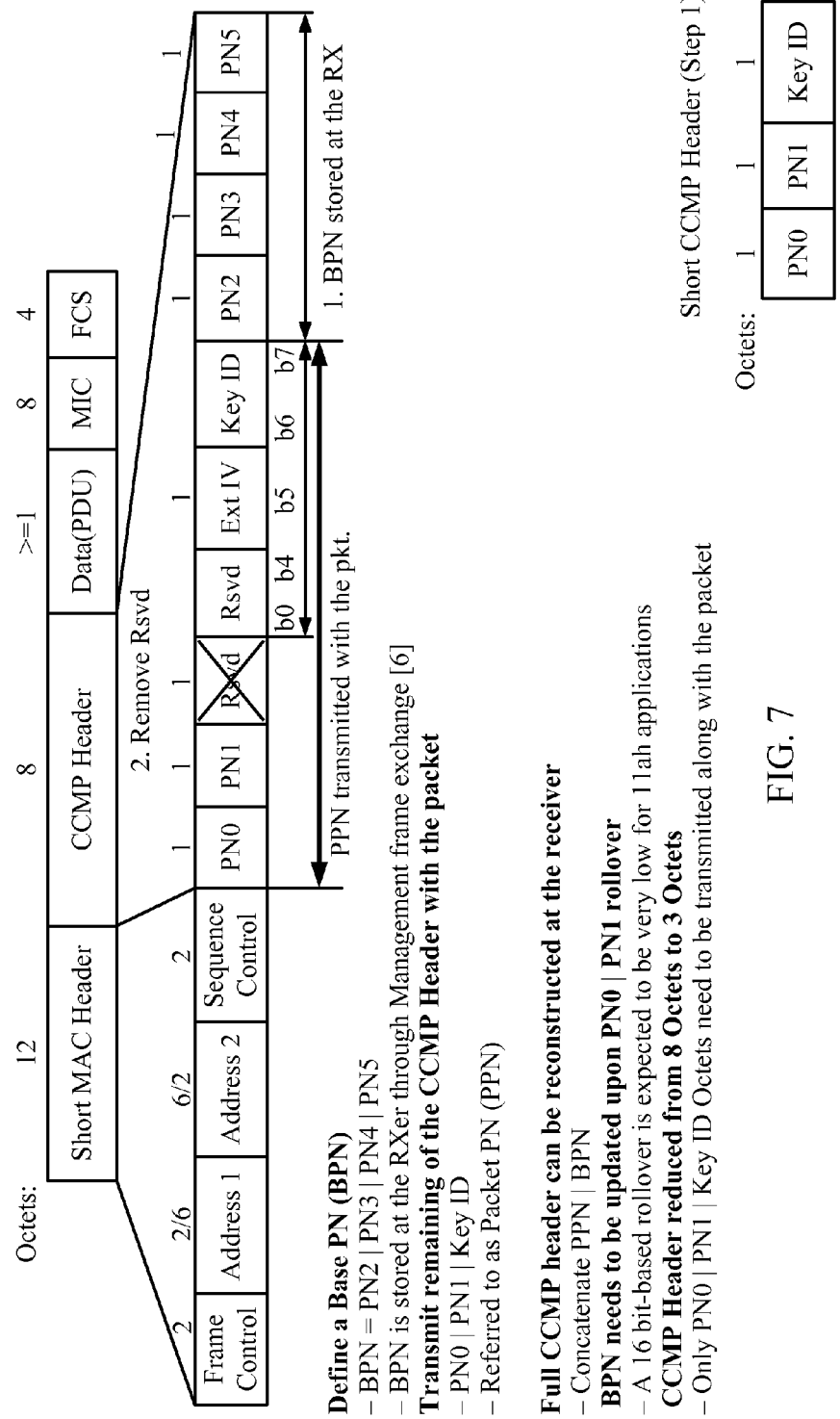
FIG. 7 illustrates an example packet structure with a compressed CCMP header, in accordance with aspects of the present disclosure.
FIG. 7A illustrates an example compressed CCMP header, in accordance with aspects of the present disclosure.

FIG. 7 illustrates an example packet 700 with a short (compressed) CCMP header 720, in accordance with aspects of the present disclosure.

As illustrated it is possible to perform CCMP Header Compression by defining a Base PN (in the illustrated example, BPN=PN2|PN3|PN4|PN5). The BPN may be stored at the receiving entity and may be obtained through Management frame exchange. According to certain aspects, a remaining portion of the CCMP Header may be sent with the packet (e.g., with least significant bits of the PN sent and the Key ID, PN0|PN1|Key ID). This may be referred to as Packet PN (PPN).

From this information, along with the stored information, the Full CCMP header information can be reconstructed at the receiver. For example, the full PN may be reconstructed from the (transmitted) PPN and (stored) BPN as: PN=Concatenate PPN|BPN. The BPN may need to be updated upon PN0|PN1 rollover. A 16 bit-based rollover is expected to be very low for 802.11ah applications and may be detected at the receiver (and the BPN updated accordingly).

As shown in FIG. 7A, using this approach, a CCMP Header reduced from 8 Octets to 3 Octets as only PN0|PN1|Key ID Octets need to be transmitted along with the packet.

FIG. 8 illustrates an example packet 800 with another example of a short CCMP header 820, in accordance with aspects of the present disclosure.

As illustrated, it is possible to perform even more efficient CCMP Header Compression. This further compression may be possible, for example, by allowing a transmitted Sequence Control (SC) number (in the MAC header) to act as PN0|PN1. In other words, PN0|PN1=SC (=Sequence Number (SN)|Fragment Number (FN)). In some cases, the Packet Number increases with steps of 16 when the MSDU is not fragmented. As a result, the PN may be effectively reduced by 4 bits.

As illustrated in FIG. 8A, this approach may result in a CCMP Header that is reduced to only 1 Octet, as only the Key ID Octet needs to be transmitted with the packet.

Figure 9:
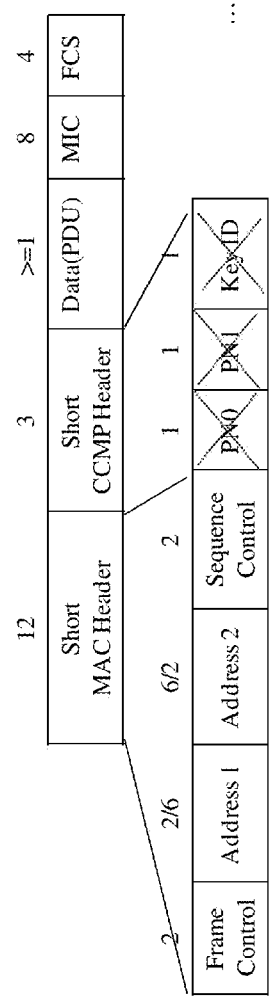
FIG. 9 illustrates an example packet structure with no CCMP header, in accordance with aspects of the present disclosure.

As illustrated in FIG. 9, it may even be possible to send a packet with no CCMP Header at all (as indicated by an empty CCMP header 920). This further compression may be possible by removing the Key ID octet. This may be possible because the value of Ext IV (included in the Key ID octet) is always 1 for CCMP. Further, because re-keying may never happen for unicast traffic and group traffic does not use short MAC headers, the Key ID may be omitted as well. As a result, the CCMP Header is basically eliminated from the short MAC header. In this case, (LSBs of) the packet number may be determined from the sequence control number SC, for example, as PN0|PN1=SC).

As described herein, by storing a portion of CCMP information (e.g., PN2|PN3|PN4|PN5) of the CCMP Header as a Base PN at the receiver (e.g., obtained through management frame exchange), CCMP header overhead may be substantially reduced. According to certain aspects, an Octet of a Rsvd field of the CCMP header may be removed when used with a short MAC Header. Further, the Key ID field of the CCMP header may also be stored at the receiver (and obtained through a management frame exchange) when it is used with short MAC header. Rekeying can be accomplished by temporarily using normal frames with a normal MAC header and the current key, while a new key is negotiated. When the new key (and Key ID) has been negotiated, it may become the key (and Key ID) that is used for the short MAC header, and the use of short MAC headers can be resumed.

According to certain, the Sequence Control field of the Short MAC Header may be used as PN0|PN1 of the of the CCMP header when it is used with short MAC Header.

Figure 5A:
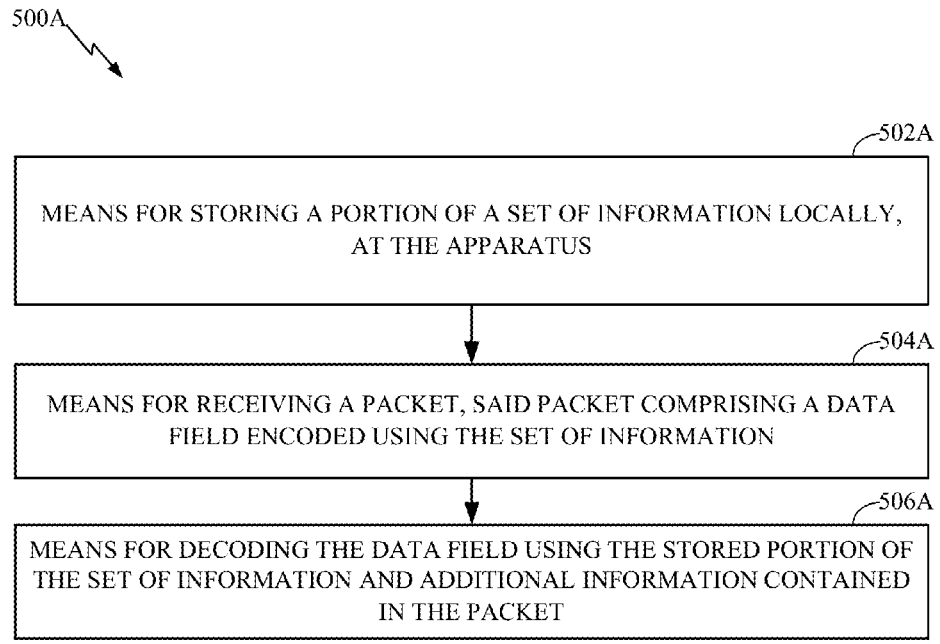
FIG. 5A illustrates example means capable of performing the operations shown in FIG. 5.
Figure 6A:
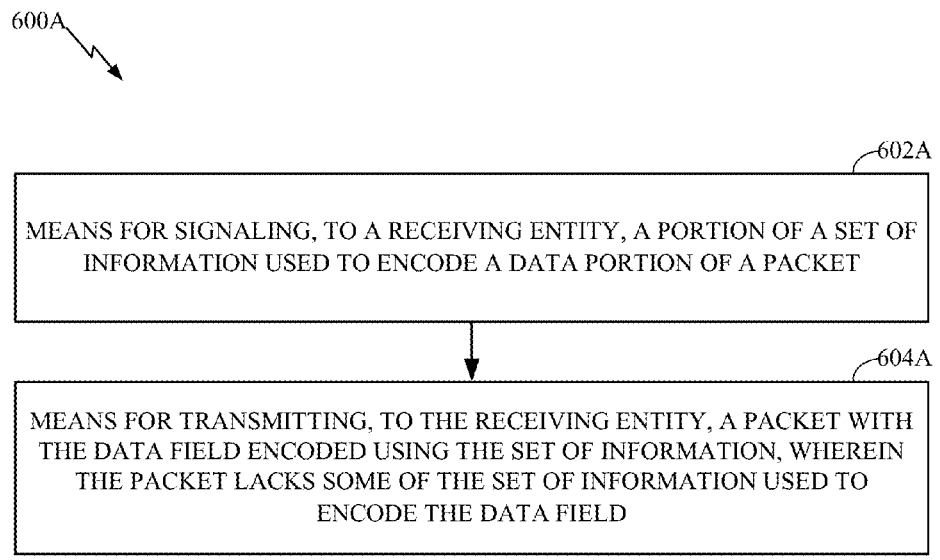
FIG. 6A illustrates example means capable of performing the operations shown in FIG. 6.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500 and 600 illustrated in FIGS. 5 and 6 correspond to means 500A and 600A illustrated in FIGS. 5A and 6A, respectively.

For example, means for transmitting may comprise a transmitter (e.g., the transmitter unit 222) and/or an antenna(s) 224 of the access point 110 illustrated in FIG. 2 or the transmitter 310 and/or antenna(s) 316 depicted in FIG. 3. Means for receiving may comprise a receiver (e.g., the receiver unit 222) and/or an antenna(s) 224 of the access point 110 illustrated in FIG. 2 or the receiver 312 and/or antenna(s) 316 depicted in FIG. 3. Means for processing, means for determining, means for detecting, means for scanning, means for selecting, or means for terminating operation may comprise a processing system, which may include one or more processors, such as the RX data processor 242, the TX data processor 210, and/or the controller 230 of the access point 110 illustrated in FIG. 2 or the processor 304 and/or the DSP 320 portrayed in FIG. 3.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer- readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communications, comprising:
a processing system configured to:
generate a packet having a data field, wherein the data field is encrypted using a set of information, wherein the set of information used to encrypt the data field comprises Counter Cipher Mode Protocol (CCMP) information having a key identifier (ID), wherein the packet lacks a first portion of the CCMP information and lacks the key ID, wherein the first portion of the CCMP information comprises most significant bits of a packet number corresponding to the packet, wherein the packet comprises a second portion of the packet number, and wherein the second portion comprises only least significant bits of the packet number; and
generate another packet comprising the first portion of the CCMP information and the key ID used to encrypt the data field; and
a transmitter configured to:
transmit, to another apparatus, the other packet comprising the first portion of the CCMP information and the key ID used to encrypt the data field; and
transmit, to the other apparatus, the packet with the encrypted data field.

2. The apparatus of claim 1, wherein the packet comprises a MAC header and an indication that the MAC header comprises a short MAC header having a reduced number of bytes relative to a normal MAC header.

3. The apparatus of claim 1, wherein the transmitter is configured to:
transmit the second portion of the CCMP information used to encrypt the data field to the other apparatus in a compressed CCMP header contained in the packet; and
transmit the first portion and the key ID of the CCMP information used to encrypt the data field to the other apparatus in a full CCMP header of the other packet.

4. The apparatus of claim 1, wherein:
the processing system is configured to increment the packet number after each transmission of the packet.

5. The apparatus of claim 1, wherein the transmitter is further configured to:
transmit a subsequent packet with an updated version of the CCMP information.

6. The apparatus of claim 1, wherein:
the packet comprises a CCMP header that lacks reserved Bytes.

7. An apparatus for wireless communications, comprising:
means for generating a packet having a data field, wherein the data field is encrypted using a set of information, wherein the set of information used to encrypt the data field comprises Counter Cipher Mode Protocol (CCMP) information having a key identifier (ID), wherein the packet lacks a first portion of the CCMP information and lacks the key ID, wherein the first portion of the CCMP information comprises most significant bits of a packet number corresponding to the packet, wherein the packet comprises a second portion of the packet number, and wherein the second portion comprises only least significant bits of the packet number;

means for generating another packet comprising the first portion of the CCMP information and the key ID used to encrypt the data field;

means for transmitting, to another apparatus, the other packet comprising the first portion of the CCMP information and the key ID used to encrypt the data field; and means for transmitting, to the other apparatus, the packet with the encrypted data field.

8. The apparatus of claim 7, wherein the packet comprises a MAC header and an indication that the MAC header comprises a short MAC header having a reduced number of bytes relative to a normal MAC header.

9. The apparatus of claim 7, wherein the means for transmitting the first portion of the CCMP information is configured to:

transmit the second portion of the CCMP information used to encrypt the data field to the other apparatus in a compressed CCMP header contained in the packet; and transmit the first portion of the CCMP information used to encrypt the data field to the other apparatus in a full CCMP header of the other packet.

10. The apparatus of claim 7, wherein:

the means for generating is configured to increment the packet number after each transmission of the packet.

11. The apparatus of claim 7, further comprising:

means for transmitting a subsequent packet with an updated version of the CCMP information.

12. The apparatus of claim 7, wherein:

the packet comprises a CCMP header that lacks reserved Bytes.

13. A method for wireless communications by an apparatus, comprising:

generating a packet having a data field, wherein the data field is encrypted using a set of information, wherein the set of information used to encrypt the data field comprises Counter Cipher Mode Protocol (CCMP) information having a key identifier (ID), wherein the packet lacks a first portion of the CCMP information and lacks the key ID, wherein the first portion of the CCMP information comprises most significant bits of a packet number corresponding to the packet, wherein the packet comprises a second portion of the packet number, and wherein the second portion comprises only least significant bits of the packet number;

generating another packet comprising the first portion of the CCMP information and the key ID used to encrypt the data field;

transmitting, to another apparatus, the other packet comprising the first portion of the CCMP information and the key ID used to encrypt the data field; and transmitting, to the other apparatus, the packet with the encrypted data field.

14. The method of claim 13, wherein the packet comprises a MAC header and an indication that the MAC header comprises a short MAC header having a reduced number of bytes relative to a normal MAC header.

15. The method of claim 13, wherein the transmitting the first portion of the CCMP information comprises:

transmitting the second portion of the CCMP information used to encrypt the data field to the other apparatus in a compressed CCMP header contained in the packet; and transmitting the first portion and the key ID of the CCMP information used to encrypt the data field to the other apparatus in a full CCMP header of the other packet.

16. The method of claim 13, further comprising incrementing the packet number after each transmission of the packet.

17. The method of claim 13, further comprising:

transmitting a subsequent packet with an updated version of the CCMP information.

18. The method of claim 13, wherein:

the packet comprises a CCMP header that lacks reserved Bytes.

19. A non-transitory computer-readable medium having instructions stored thereon to cause an apparatus to:

generate a packet having a data field, wherein the data field is encrypted using a set of information, wherein the set of information used to encrypt the data field comprises Counter Cipher Mode Protocol (CCMP) information having a key identifier (ID), wherein the packet lacks a first portion of CCMP of information and lacks the key ID, wherein the first portion of the CCMP information comprises most significant bits of a packet number corresponding to the packet, wherein the packet comprises a second portion of the packet number, and wherein the second portion comprises only least significant bits of the packet number;

generate another packet comprising the first portion of the CCMP information and the key ID used to encrypt the data field;

transmit, to another apparatus, the other packet comprising the first portion of the CCMP information and the key ID used to encrypt the data field; and transmit, to the other apparatus, the packet with the encrypted data field.

20. An access point, comprising:

at least one antenna;

a processing system configured to:

generate a packet encrypted with a data field using a set of information, wherein the set of information used to encrypt the data field comprises Counter Cipher Mode Protocol (CCMP) information having a key identifier (ID), wherein the packet lacks a first portion of the CCMP information and lacks the key ID, wherein the first portion of the CCMP information comprises most significant bits of a packet number corresponding to the packet, wherein the packet comprises a second portion of the packet number, and wherein the second portion comprises only least significant bits of the packet number; and generate another packet comprising the first portion of the CCMP information and the key ID used to encrypt the data field; and a transmitter configured to:

transmit, via the at least one antenna, to a station, the other packet comprising the first portion of the CCMP information and the key ID used to encrypt the data field; and transmit, to the station, the packet with the encrypted data field.

* * * * *